United States Patent
Grafton

[11] 4,070,089
[45] Jan. 24, 1978

[54] TWO DIMENSIONAL LASER SCANNER WITH MOVABLE CYLINDER LENS

[75] Inventor: David A. Grafton, Santa Monica, Calif.

[73] Assignee: Xerox Corporation, Stamford, Conn.

[21] Appl. No.: 701,473

[22] Filed: July 1, 1976

[51] Int. Cl.$^2$ .................. G02B 27/17; G03G 15/32
[52] U.S. Cl. .......................................... 350/7; 355/8; 355/66; 250/236
[58] Field of Search .................. 350/6, 7, 285; 355/8, 355/11, 66; 358/199, 204, 205, 285, 293, 300; 250/236, 235, 234

[56] References Cited

U.S. PATENT DOCUMENTS

| | | | |
|---|---|---|---|
| 3,701,999 | 10/1972 | Congleton et al. | 350/6 |
| 3,719,780 | 3/1973 | Gazard et al. | 350/6 |
| 3,877,777 | 4/1975 | Glenn | 350/7 |
| 3,944,323 | 3/1976 | Starkweather | 350/6 |
| 3,946,150 | 3/1976 | Grafton | 358/285 |
| 3,966,319 | 6/1976 | Lang | 355/8 |
| 3,970,359 | 7/1976 | Starkweather | 350/7 |
| 3,973,825 | 8/1976 | Starkweather | 250/235 |
| 4,002,829 | 1/1977 | Hutchison | 358/293 |

*Primary Examiner*—Jon W. Henry
*Attorney, Agent, or Firm*—James J. Ralabate; Franklyn C. Weiss; Ronald L. Taylor

[57] ABSTRACT

An intensity modulated laser beam is directed to a rotating scanner having a plurality of facets which scans the beam across the surface of a movable mirror in a first scan direction. The mirror is movable in a manner whereby the beam is deflected in a second scan direction. The light reflected from the movable mirror is directed through a focusing lens onto a movable cylinder lens located adjacent the platen which is movable in a direction corresponding to the second scan direction, thereby providing two-dimensional scanning of a document. In one embodiment, the movable mirror and the movable cylinder lens are driven by a single motor and are coupled together in the manner whereby the movement thereof is mechanically interlocked thereby providing perfect tracking of the scanned laser beam within the clear aperture of the cylinder lens. In a second embodiment, the movable mirror and the movable cylinder lens may be independently driven and interlocked electronically. By proper focusing of the laser beam such that the sagittal focal plane is located between the movable mirror and the rotating scanner, a compromise of sagittal motion compensation due to pyramidal errors of the scanner facets and sagittal angular variations of the movable mirror is achieved. The rotating scanner may also be tilted in a predetermined manner whereby unsymmetrical scan linearity in the first scan direction upon each side of the scan line center is minimized.

8 Claims, 11 Drawing Figures

TWO DIMENSIONAL LASER SCANNER WITH MOVABLE CYLINDER LENS

BACKGROUND OF THE INVENTION

Laser scanning techniques for writing on a medium sensitive to the laser beam have been disclosed in the prior art. In general, the laser beam is intensity modulated in accordance with information to be printed on a receiving medium, the modulated laser beam being directed to a rotating scanner, or reflector, such as a multifaceted polygon. The rotating scanner in turn causes the modulated laser beam to scan, in sequence, across a sensitive medium located a distance away from the scanner. The information contained in the intensity modulated laser beam can be directly written on the medium if the medium is sensitive to the laser beam, or in an alternative embodiment, the laser beam can selectively discharge a charged insulating surface in accordance with the intensity of the beam. In the alternative embodiment, the degree of charge dissipation corresponds to the information contained in the laser beam. The areas of the medium which are not discharged by the laser beam are subsequently developed, for example, by standard xerographic techniques.

Present day copiers which utilize the xerographic process include a platen upon which the document to be reproduced is placed, the platen being flat or curved. The document is generally flood illuminated and the reflections therefrom are imaged via a copy lens to a charged photoconductive medium to discharge the medium in accordance with the image formed on the document. Although copiers now commercially available are not adapted to utilize laser scanning techniques to scan a document placed on the copier platen, it would be advantageous if such copiers could be modified to incorporate the aforementioned laser scanning techniques. The modified copier would require a system which, inter alia, provides for two-dimensional scanning.

U.S. Pat. No. 3,752,558 discloses a flat field scanning system which utilizes a pulley system with a single motor to move a reflector at one-half the speed of a spaced apart reflector so that the optical distance between the detection station and the document remains constant throughout the scan. However, the patented system does not utilize laser scanning but provides flood type illumination for illuminating a document, such exposure technique having obvious limitations. The use of laser flux for illumination provides significant advantages radiometrically over conventional white light illumination systems. The particular requirements/problems involved when using a laser scanning system are not present when flood type illumination is utilized. For example, when a two-dimensional laser scanning system is utilized it is required that the scanning of the document be directly synchronized with the movement of the scanning laser beam. Further, the utilization of the laser type scanning system requires that compensation be provided in order that the variation in the trajectory of the laser beam at the platen be minimized. Additionally, unless the scanner is illuminated by the laser beam at a proper angle of incidence, the beam will be non-symmetrically reflected by the scanner giving rise to non-symmetrical deflections in one of the scan directions upon each side of the center of the scan line.

SUMMARY OF THE PRESENT INVENTION

The present invention provides a system for two-dimensional laser scanning of a document positioned on a platen, the system being capable of detecting small variations in image density at high rates of speeds and which provides accurate synchronization between document scanning and the movement of the scanning laser beam and minimizes both variation in laser beam trajectory at the platen and non-symmetrical deflections of the scan line. In particular, an intensity modulated laser beam is directed to a rotating scanner having a plurality of facets which scans the beam across the surface of a movable mirror in a first scan direction. The mirror is movable in a manner whereby the beam is deflected in a second scan direction. The light reflected from the movable mirror is directed through a focusing lens onto a movable cylinder lens located adjacent the platen which is movable in a direction corresponding to the second scan direction, thereby providing two-dimensional scanning of the document. In one embodiment, the movable mirror and the movable cylinder lens are driven by a single motor and are coupled together in the manner whereby the movement thereof is mechanically interlocked thereby providing perfect tracking of the scanned laser beam within the clear aperture of the cylinder lens. In a second embodiment, the movable mirror and the movable cylinder lens may be independently driven and interlocked electronically. By proper focusing of the laser beam such that the sagittal focal plane is located between the movable mirror and the rotating scanner, a compromise of sagittal motion compensation due to pyramidal errors of the scanner facets and sagittal angular variations of the movable mirror is achieved. The rotating scanner may also be tilted in a predetermined manner whereby unsymmetrical scan linearity in the first scan direction upon each side of the scan line center is minimized.

It is an object of the present invention to provide a flat field scanning system which is capable of detecting small variations in image density at high speeds.

It is a further object of the present invention to provide a flying spot laser scanning system which is capable of scanning the laser spot across a stationary document.

It is still a further object of the present invention to provide a two-dimensional laser scanning system for scanning the laser beam across a document positioned on a platen, synchronization being provided between the scanning laser beam and the movement of a focusing cylinder lens in a first direction by utilizing, in a first embodiment, a single motor which drives both a mirror which reflects the incident laser beam and the cylinder lens and, in a second embodiment, by electronically interlocking the mirror and cylinder lens each of which is independently driven.

It is another object of the present invention to provide a flat field, two-dimensional scanning system whereby unsymmetrical scan in one scan direction is minimized.

It is a further object of the present invention to provide a flat field, two-dimensional laser scanning system which includes a multifaceted rotating scanner, a compromise of sagittal motion compensation due to pyramidal angular errors of the polygon facets and sagittal angular variations of the movable mirror being achieved by focusing the incident laser beam such that the sagittal focal line of the laser beam is located at a plane spaced from said scanner.

BRIEF DESCRIPTION OF THE DRAWINGS

For a better understanding of the invention as well as other objects and further features thereof, reference is made to the following description which is to be read in conjunction with the following figures wherein.

DESCRIPTION OF THE PREFERRED EMBODIMENT

Figure 1:
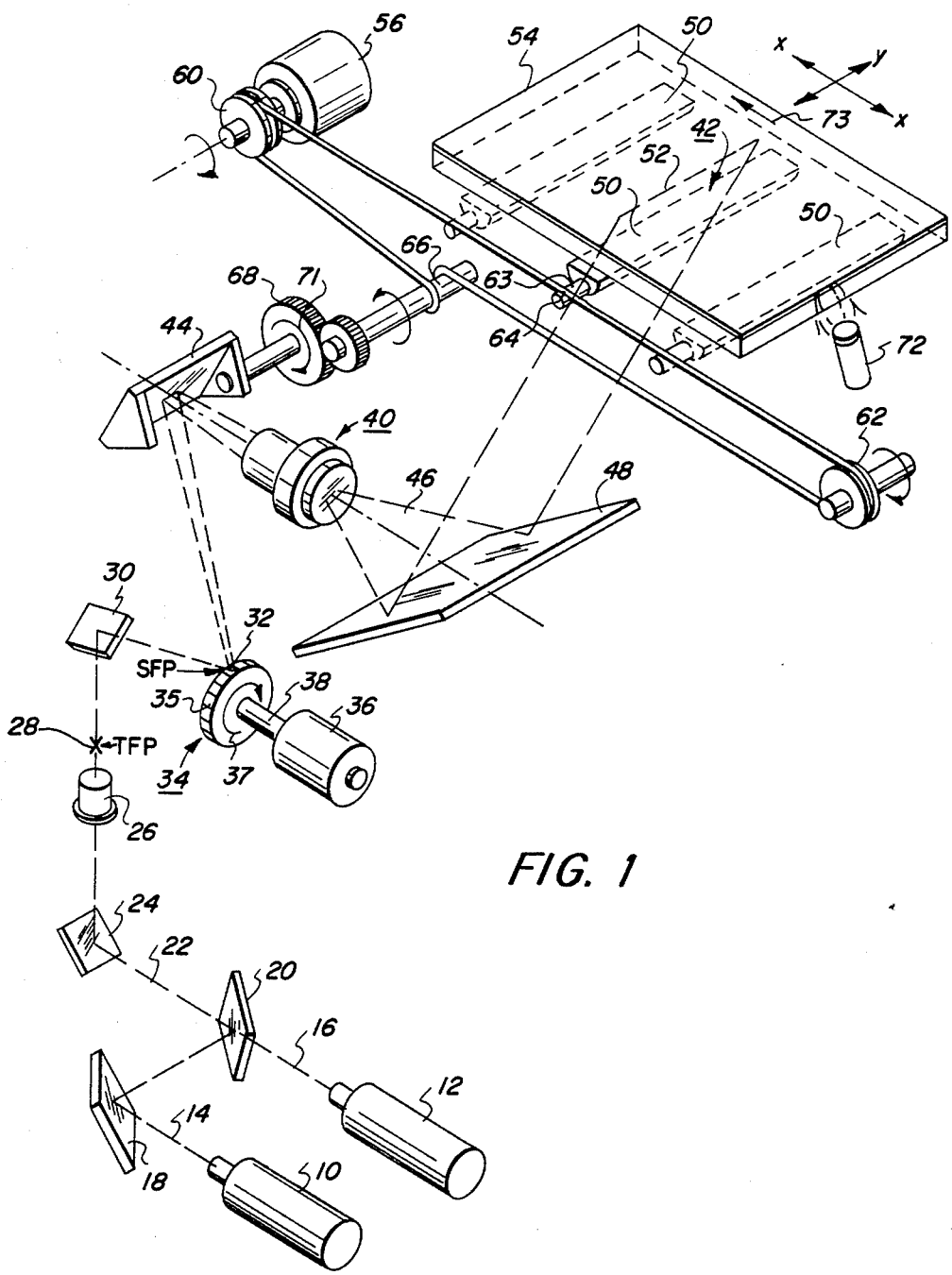
FIG. 1 illustrates a first embodiment of the two-dimensional laser scanning system of the present invention.

Referring now to FIG. 1, a first embodiment of the two-dimensional document scanning system of the present invention is shown. Light sources 10 and 12 provide original beams 14 and 16, respectively, for utilization by the scanning system. Light sources 10 and 12 are preferably lasers which provide colliminated beams of monochromatic light, laser 10 comprising a helium-cadmium laser which generates blue laser light at a wavelength of 4416A and laser 12 comprises a helium-neon laser which generates red laser light at a wavelength of 6328A. The use of the two laser beams ensures that the document scanner is not insensitive at the wavelengths of lasers 10 or 12 and hence, the system is suitable for detecting laser fluxes reflected from multi-colored documents. Light beam 14 is incident upon mirror 18 which directs the light beam to beam splitter 20. Light beam 16 is also incident on beam splitter 20, which is positioned at an angle to reflect the flux in beam 14 as a combined beam 22. Beam 22 is incident upon mirror 24 which reflects the beam upwards to an achromatic astigmatic anamorphic lens 26. Lens assembly 26 causes the laser beam to be focused at two separate locations, designated in FIG. 1 as tangential focal line (TFP) 28 and via mirror 30 as sagittal focal line (SEP) 32. The sagittal focal line 32 as shown in the figure is located near or at the surface of rotating scanner 34. Rotating scanner 34, shown as comprising a polygon having a plurality of reflecting facets 35, is driven by motor 36 via drive shaft 38. As will be explained hereinafter in more detail, points on the TFP and SFP planes are associated with the formation of a scanning spot and in conjunction with lens assemblies 40 and 42 control the spot intensity profiles in the Y and X directions, respectively.

Scanner 34 rotates in the direction of an arrow 37 causing the laser spot incident thereon to deflect in the Y direction at movable mirror 44. The scanning beam is optically processed via lens assembly 40 and the output beam 46 is incident on mirror 48. Light reflected from mirror 48 is directed to lens assembly 42 which comprises a cylinder lens 50. Cylinder lens 50 produces a scan line 52 in the Y direction at the document platen 54. Although not shown in the figure, a document 55 to be scanned is placed face down on the top surface of transparent platen 54. In a first embodiment, a single motor 56 drives a cable 58 wrapped around gears 60 and 62. The cable 58 is affixed to shaft 63 coupled to cylinder lens 50 at point 64 and causes the cylinder lens 50 to be driven in the X direction in a manner whereby the complete document is tranversed. Cable 58 is also wound around a spindle, or shaft 66 which is operatively coupled to a rotating gear cam 68. Gear cam 68, in turn, is coupled to mirror 44 via shaft 70, shaft 70 rotating mirror 44 in the direction of arrow 71 to provide the X scanning motion. In an embodiment of the invention which has been reduced to practice, the distance over which well formed spot intensity profiles have been maintained in the X direction is about 11½ inches whereas the length of the line scanned in the Y direction due to the rotating scanner 34 over which well formed spot intensity profiles are maintained is approximately 14½ inches. The X direction movement of cylinder lens 50 and the diameter of spindle 66 are chosen such that the angular movement of mirror 44 causes the scanning laser spot to exactly track the moving cylinder lens 50.

The two-dimensional flat platen scanner of the present invention provides, in this embodiment, a mechanically interlocked movement of scanning cylinder lens 50 and turning mirror 44 which allows essentially perfect tracking of the scanner laser beam within the clear aperture of the cylinder lens 50. As shown in phantom in the figure, lens 50 is movable in the X direction of scan. This improves upon prior art system configurations which utilize separate power modes to linearly deflect both mirror 44 and cylinder lens 50 since driving both mirror 44 and cylindrical lens 50 from a single motor 56 simplifies the scanning system and assures constant synchronization.

When a document 55 is placed face down on platen 54, it is scanned by the two color laser beam spots 22, the document reflecting the incident radiation flux in accordance with the document information being scanned. A fraction of the reflected flux is detected by several photomultiplier tubes (represented by a single photomultiplier tube 72) located under the platen 54. In a typical embodiment, the distance from cylinder lens 50 and document platen 54 is about 10 inches. This permits the photomultiplier tubes 72 to be spaced so as to pickup a relatively constant amount of radiation flux no matter where the spot is located over the platen 54. The photomultipliers convert the variation in intensity of the reflected laser beam into electrical information signals which may be transmitted to a buffer for storage or to a recording device for producing a copy of the document scanned. A document of 11 inches by 14 inches is typically scanned in about 0.8 seconds. The cylindrical lens 50 "flies" back to its original position (adjacent either end of the platen 54) in about 0.2 seconds making the effective document scanning rate about 1 page per second. Cylinder lens 50 is caused to fly back to its original position by spring means or other return mechanisms which are not shown in the figure.

As set forth hereinabove, lens assembly 26 is selected to focus laser beam 22 at two different points in different planes. In particular, laser beam 22 is caused to focus in the sagittal plane (parallel to the axis of scanner) at the polygon facets, the beam width in the direction of scan preferably being about the width of two facets 35. The cylinder lens 50 has its power plane in the tangential (Y) plane and in conjunction with lens 40 acts to focus the beam in the saggital plane with a depth of focus which lies on the top surface of platen 54 on which the document 55 rests. The lens assembly 26 in conjunction with lens 40 acts to focus the beam 22 in the tangential plane within a depth of focus which also lies on the top surface of platen 54 on which the document 55 rests. Lens 26 is composed of at least two separate components, one of which provides for tangential focus of an incident beam, the other component providing for sagittal beam focus. By changing the design of the sagittal component, the sagittal focus point may be moved to a desired location. A lens which may be utilized as lens assembly 26 is disclosed in U.S. Pat. No. 3,946,150, the teachings of which necessary for the understanding of the present invention being incorporated herein by reference.

In operation, lasers 10 and 12 are energized and the resultant combined beam 22 is focused (in the sagittal focal plane) on the scanner facets 35. The beam scans mirror 44 in the Y direction and lens 40, mirror 48 and cylinder lens 42 causes the focused laser beam to trace out scan line 52 in the Y direction on the platen 54 (and document 55). In order to provide the X-direction scan, motor 56 is energized which simultaneously causes mirror 44 to turn in the direction of arrow 71 and cylinder lens 50 to move, in synchronism, in the direction of arrow 73. The cylinder lenses shown in phantom illustrate the various X-direction positions of the lens 50 as the document scanning proceeds from an initial position (right hand side of platen 54) to a position wherein document 55 is completely scanned. The flux reflected from the surface of document 55 is detected by photomultiplier tubes 72, the output signal therefrom being either stored or utilized to reproduce a copy of the scanned document.

Figure 2:
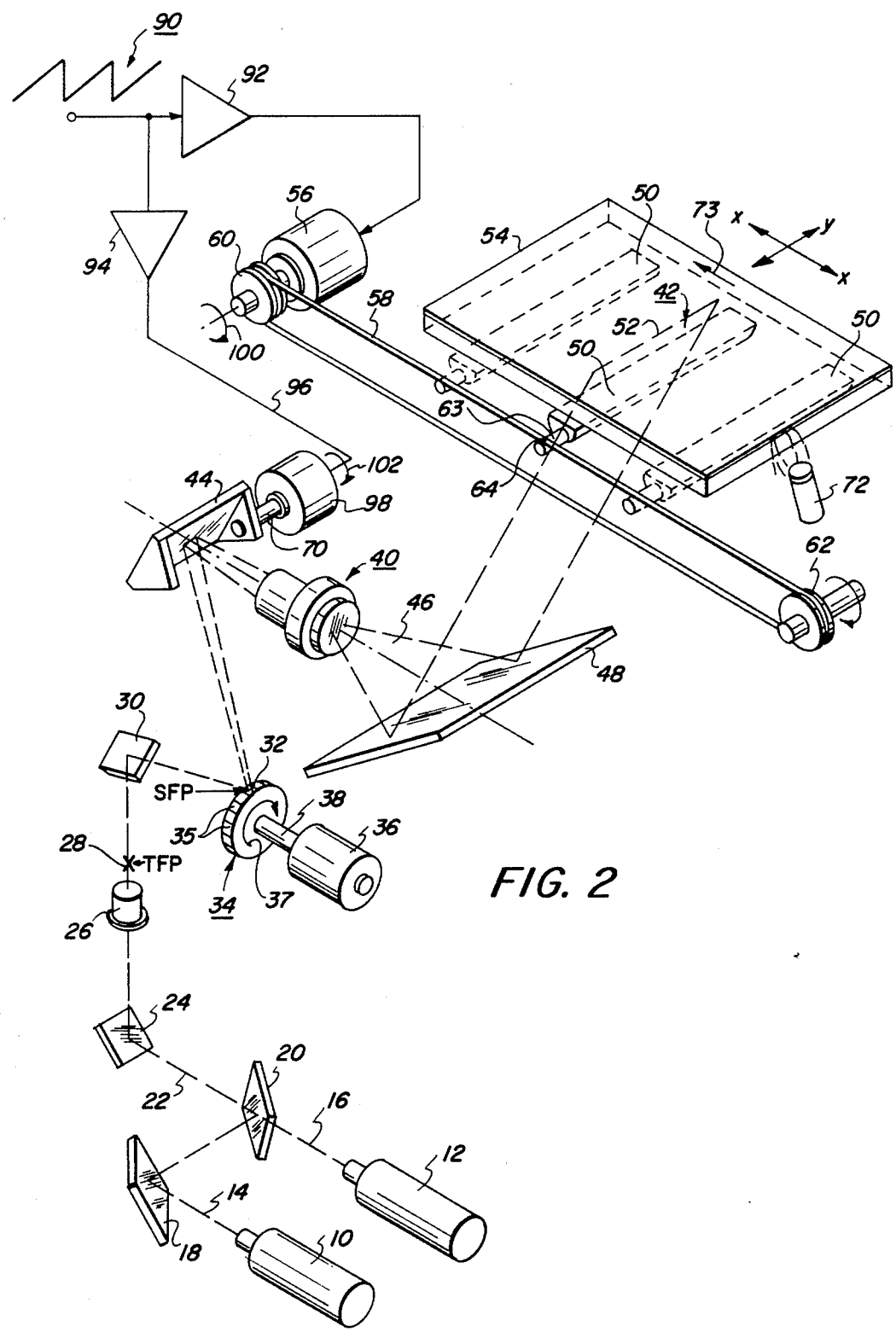
FIG. 2 illustrates a second embodiment of the two-dimensional laser scanning system of the present invention.

FIG. 2 shows a second embodiment of the two-dimensional laser scanning system of the present invention. The system shown is essentially that shown in FIG. 1 with the difference being in the manner in which movable mirror 44 and cylinder lens 50 are driven. It should be noted that the elements identified by the same reference numerals in both figures are identical. In lieu of the mechanically interlocked driving system shown in FIG. 1, mirror 44 and cylinder lens 50 are independently driven and electronically interlocked. In particular, a repetitive, time varying signal, such as the sawtooth waveform 90 shown, is provided simultaneously to the inputs of adjustable gain amplifiers 92 and 94. The output of amplifier 92 is coupled to motor 56 and the output of amplifier 94 is coupled to drive motor 98 mounted on the shaft 70 via lead 96, shaft 70 rotating mirror 44. The gains of amplifiers 92 and 94 are adjustable to provide the required synchronization between mirror 44 and cylinder lens 50.

In operation, signal 90 is simultaneously applied to motors 56 and motor 98 via amplifiers 92 and 94, respectively, the ramp portion of the signal causing motors 56 and 98 to turn drive gear 60 and mirror 44 respectively in the direction of the arrows 100 and 102. Gear 60 drives cable 58 which, in turn, moves cylinder lens 50 as described hereinabove whereas drive motor 98 drives mirror 44 as set forth hereinabove. In essence, mirror 44 and cylinder lens 50 are driven separately in contradistinction to the mechanical interlocking shown in FIG. 1, the interlocking being provided electronically by simultaneous energization of motors 56 and 98. The retrace portion of signal 90 allows the mirror 44 and cylinder lens 50 to return to its original position.

Figure 3B:
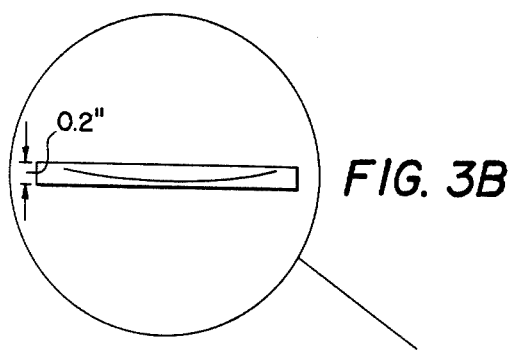
FIG. 3B illustrates by insertion the progressive bowing of the Y direction of scan of the upper laser beam trajectory shown in FIG. 3A.
Figure 3A:
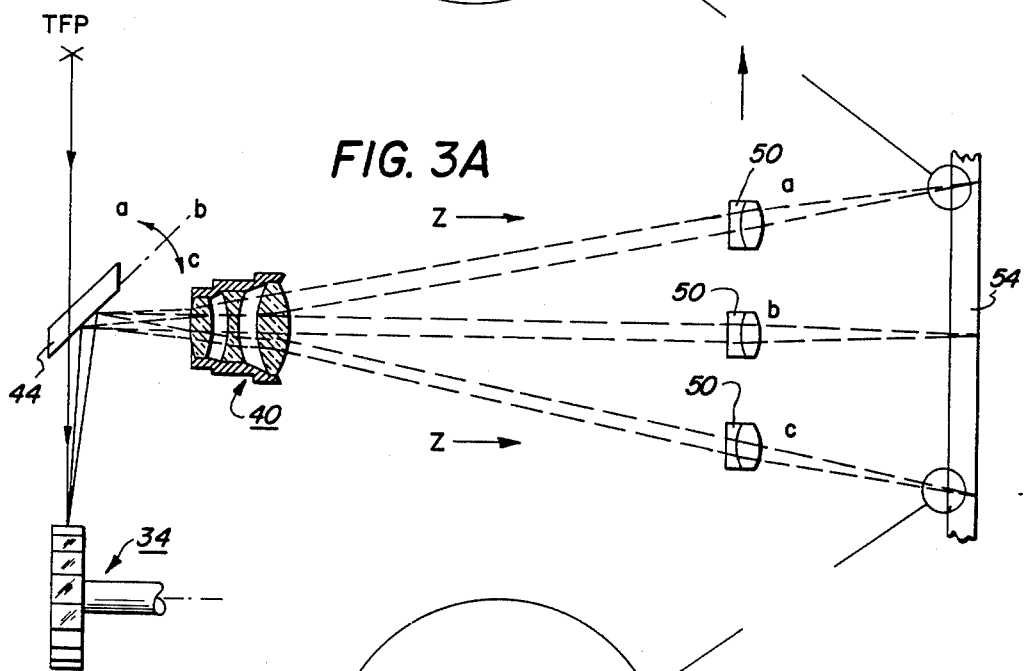
FIG. 3A is an optical schematic viewed along the Y-direction and shows the laser beam trajectory viewed at different lens positions.
Figure 3C:
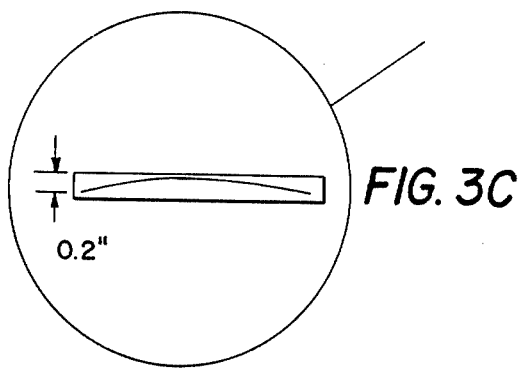
FIG. 3C illustrates by insertion the progressive bowing of the Y direction of scan of the lower laser beam trajectory shown in FIG. 3A.
Figure 4A:
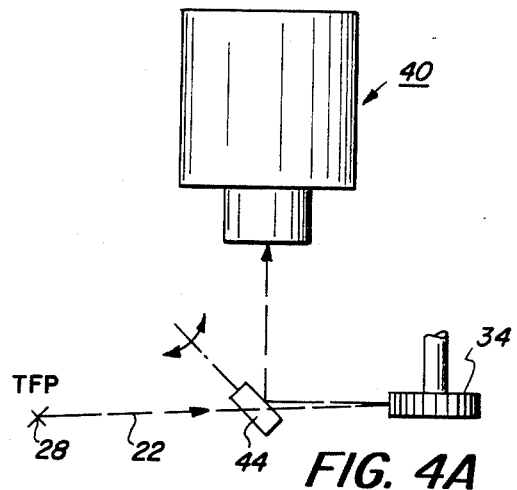
FIGS. 4(a) and 4(b) and 5(a) and 5(b) illustrate how unsymmetrical scan linearity in the Y-scan direction is minimized.
Figure 4B:
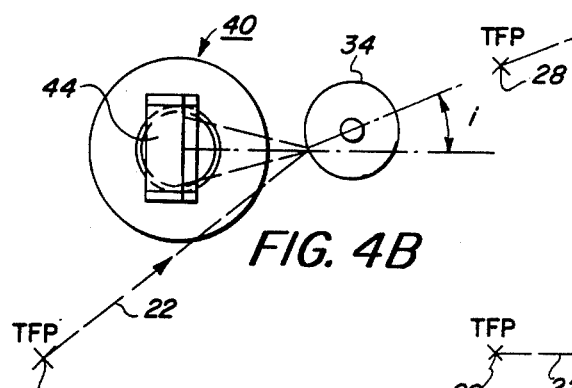

FIG. 3 illustrates the optical schematic as viewed along the Y direction. Cylinder lens 50 is shown located in three positions a, b, and c which correspond to position as 1, 2, and 3 of mirror 44, respectively. As can be observed from the figure, the X direction of scan is accomplished by simultaneous movement of mirror 44 and cylinder lens 50, scanner 34 producing the Y direction of scan which is in the direction perpendicular to the plane of the paper. Of particular significance is the laser beam trajectory at the cylinder lens 50 as viewed from the Z direction as shown in the upper insert. On axis, in position b, the Y deflection of the beam at the cylindrical lens 50 is substantially straight. As mirror 44 tilts and deflects the laser beam towards the edge of the field, the Y direction of scan becomes progressively bowed (variation from a linear scan) as shown in the upper and lower inserts until the bow reaches a maximum of at the edge of the field. In accordance with the teachings of the present invention, by locating the sagittal focal point between the mirror 44 and the scanner facets 35, preferably midway therebetween, the effect of the bow at the platen 54, in the Y direction, can be substantially reduced. It should be noted that bow is caused by misalignment or other errors in the optical system geometry and by tilting mirror 44 when providing the X-scan. By choosing the focus of cylinder lens 50 between mirror 44 and scanner 34, cylinder lens 50 compensates for the error causing bow. In effect, a compromise of sagittal motion compensation due to pyramidal angular errors of the scanner mirror facets and sagittal variations of mirror 44 is provided. As set forth hereinabove, the sagittal focal point is located at a desired plane by proper selection of lens 26:

FIG. 4A, a plane view of a portion of the optical system of FIG. 1 and FIG. 2, and FIG. 4B showing the view looking into the rear of lens assembly 40, shows how scanner 34 is flooded with laser flux emanating from the tangential focal line 28. In this configuration, laser beam 22 is incident on scanner 34 at a fairly large angle of incidence $i$, typically at 30°. This geometrical arrangement allows the laser beam 22 to miss striking mirror 44 while flooding at least two facets of the scanner 34.

Due to optical geometrical considerations, scanner facet misalignments, etc., this relatively large angle of incidence which arises when the scanner 34 is positioned as shown in FIG. 1 causes non-symmetrical angular deviations of laser beam 22.

Figure 5A:
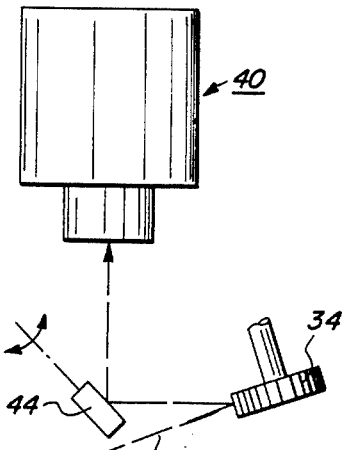
Figure 5B:
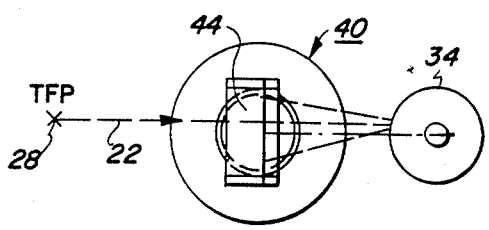

The non-symmetrical angular deviation of the laser beam 22 by scanner 34 gives rise to non-symmetrical deflections in the Y scan direction upon each side of the center of the scan line at the platen 54. Alternatively, to provide for a symmetrical scan, scanner 34 is tilted as shown in FIGS. 5A and 5B (FIG. 5A being a plane view of a portion of the optical system of FIGS. 1 and 2, FIG. 5B showing the view looking into the rear of lens assembly 40), whereby the unsymmetrical scan linearity feature is overcome. Such an arrangement produces a tangential, linear deflection which is symmetrical on either side of the optical axis of cylinder 50.

Figure 6A:
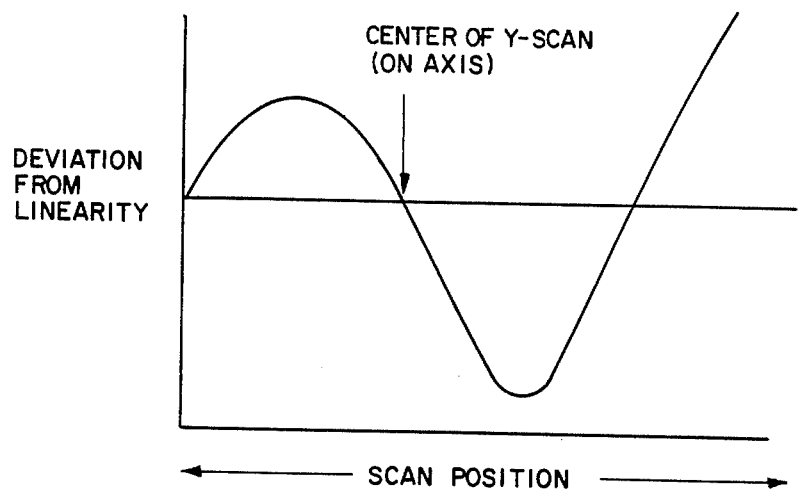
FIGS. 6(a) and 6(b) graphically illustrate the results of compensating for an unsymmetrical scan linearity.
Figure 6B:
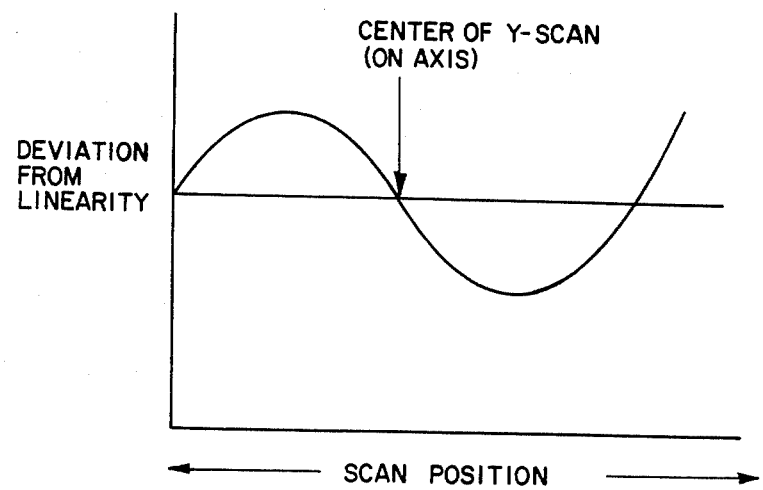

FIGS. 6(a) and 6(b) illustrate graphically how the unsymmetrical scan linearity produced by the arrangement shown in FIGS. 4A and 4B (FIG. 6(a)) is compensated for by using the arrangement shown in FIGS. 5A and 5B (FIG. 6(b)). The abscissa coordinates of the graphs are set forth in terms of the position of the laser beam relative to the optical axis of the system and the ordinate coordinates are set forth in terms of deviation from linearity.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A flying spot scanning system comprising:
   means for generating a beam of coherent light,
   a rotatable mirror,
   a rotatable polygon scanner located between said light generating means and said rotatable mirror and in the path of said beam for scanning said beam onto said rotatable mirror,
   a stationary mirror positioned adjacent said rotatable mirror,
   lens means interposed between said rotatable mirror and said stationary mirror whereby the beam reflected from said rotatable mirror is directed to said stationary mirror through said lens means,
   a generally planar document support member,
   a movable cylinder lens movable in a first direction and positioned adjacent said document support member, said stationary mirror reflecting said beam to said document support member through said cylinder lens, said cylinder lens extending in a direction whereby the beam will be scanned across a document placed on said document support member in a second direction and orthogonal to said first direction, and
   means for controlling the rotation of said rotatable mirror and the movement of said cylinder lens such that the light reflected from said rotatable mirror is always incident on said cylinder lens as the cylinder lens moves in said first direction whereby said document is completely scanned.

2. The scanning system as defined in claim 1 wherein said generating means comprises laser means.

3. The scanning system as defined in claim 2 wherein said laser means comprises first and second lasers, said first laser generating an output beam having a first wavelenght and said second laser means generating an output beam having a second wavelength, said first wavelength being different than said second wavelength.

4. The scanning system as defined in claim 1 wherein said controlling means comprises a motor which drives a drive member, said drive member being coupled to said rotatable mirror and said cylinder lens.

5. The scanning system as defined in claim 4 wherein said drive member comprises a cable arrangement.

6. The scanning system as defined in claim 1 wherein said controlling means comprises an amplifier the output of which is coupled to first and second drive means, said first drive means being coupled to said rotatable mirror and said second drive means being coupled to said cylinder lens.

7. The scanning system as defined in claim 1 further including a lens assembly positioned between said light generating means and said rotatable mirror and in the path of said beam, said lens assembly focusing the beam incident thereon at two different focal lines.

8. The scanning system as defined in claim 7 wherein one of said focal lines is located between said rotating polygon scanner and said rotatable mirror.

* * * * *